US009663086B2

(12) United States Patent
Ozeki et al.

(10) Patent No.: US 9,663,086 B2
(45) Date of Patent: May 30, 2017

(54) VEHICULAR BRAKE DEVICE

(71) Applicants: ADVICS CO., LTD., Kariya, Aichi-pref. (JP); TOYOTA JIDOSHA KABUSHIKI KAISHA, Toyota-shi, Aichi (JP)

(72) Inventors: Yoshimitsu Ozeki, Nagoya (JP); Hiroaki Niino, Toyota (JP); Takahiro Okano, Chiryu (JP); Masaaki Komazawa, Miyoshi (JP); Kiyoyuki Uchida, Konan (JP)

(73) Assignees: ADVICS CO., LTD., Kariya, Aichi-Pref. (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 0 days.

(21) Appl. No.: 14/897,261

(22) PCT Filed: Jun. 17, 2014

(86) PCT No.: PCT/JP2014/065973
§ 371 (c)(1),
(2) Date: Dec. 10, 2015

(87) PCT Pub. No.: WO2014/208394
PCT Pub. Date: Dec. 31, 2014

(65) Prior Publication Data
US 2016/0121866 A1    May 5, 2016

(30) Foreign Application Priority Data
Jun. 25, 2013   (JP) .................................. 2013-133051

(51) Int. Cl.
*B60T 13/14*    (2006.01)
*B60T 7/04*    (2006.01)
(Continued)

(52) U.S. Cl.
CPC ............ *B60T 13/146* (2013.01); *B60T 7/042* (2013.01); *B60T 8/4077* (2013.01);
(Continued)

(58) Field of Classification Search
CPC ...... B60T 13/146; B60T 7/042; B60T 13/145; B60T 8/4081; B60T 13/686
See application file for complete search history.

(56) References Cited

U.S. PATENT DOCUMENTS

2002/0096939 A1   7/2002   Sakata et al.
2011/0285199 A1   11/2011  Ishida
(Continued)

FOREIGN PATENT DOCUMENTS

JP    11-147466 A     6/1999
JP    2002-220041 A   8/2002
(Continued)

OTHER PUBLICATIONS

International Search Report (PCT/ISA/210) issued on Sep. 16, 2014, by the Japanese Patent Office as the International Searching Authority for International Application No. PCT/JP2014/065973.

*Primary Examiner* — Melanie Torres Williams
(74) *Attorney, Agent, or Firm* — Buchanan Ingersoll & Rooney PC

(57) ABSTRACT

The vehicular brake device according to the present invention is provided with a first flow passage connecting a first electromagnetic valve and a wheel cylinder, a second flow passage connecting a reservoir portion capable of storing brake fluid and the first flow passage and a second electromagnetic valve disposed in the second flow passage. A pressure differential generating portion generates a predetermined pressure differential by moving a master piston by a drive pressure generating portion after an execution of an advancement control to advance the master piston so that the (Continued)

stroke position of the master piston is within an advanced side area. A second electromagnetic valve control portion places the second electromagnetic valve in an open state for a period including at least a portion of the period of time in an execution period of the advancement control.

5 Claims, 8 Drawing Sheets

(51) Int. Cl.
*B60T 13/66* (2006.01)
*B60T 13/68* (2006.01)
*B60T 8/40* (2006.01)

(52) U.S. Cl.
CPC .......... *B60T 8/4081* (2013.01); *B60T 13/662* (2013.01); *B60T 13/686* (2013.01)

(56) References Cited

U.S. PATENT DOCUMENTS

| | | | |
|---|---|---|---|
| 2013/0035835 A1 | 2/2013 | Hachtel et al. | |
| 2013/0221736 A1* | 8/2013 | Kuki | B60T 13/686 303/20 |
| 2016/0114775 A1* | 4/2016 | Ishino | B60T 7/042 701/70 |

FOREIGN PATENT DOCUMENTS

| | | | |
|---|---|---|---|
| JP | 2004-237982 A | 8/2004 | |
| JP | 2006-298313 A | 11/2006 | |
| JP | 2006-313823 A | 11/2006 | |
| JP | 2011-240873 A | 12/2011 | |
| JP | 2013-035542 A | 2/2013 | |
| WO | WO 2014/002987 A1 | 1/2014 | |

* cited by examiner

CYLINDER OPENING SIDE ⟵⟶ CYLINDER BOTTOM SURFACE SIDE

VEHICULAR BRAKE DEVICE

TECHNICAL FIELD

This invention relates to a vehicular brake device which controls the braking force applied to a vehicle in response to the amount of brake operation by an operator of the vehicle.

BACKGROUND ART

A conventional vehicular brake device is known, which includes a master cylinder which supplies a wheel cylinder with a brake fluid, a conduit connecting the wheel cylinder and the master cylinder and an electromagnetic valve disposed in the conduit and generating a predetermined pressure differential between the wheel cylinder and the master cylinder. In such conventional vehicular brake device, the electromagnetic valve controls flow of brake fluid in response to an electric power supplied thereto. Further, as an example of method for obtaining an operating characteristic (relationship between the valve opening electric current, etc. and the pressure differential) of the electromagnetic valve which is a component forming the vehicular brake device, a method disclosed in a Japanese Patent Publication No. 2004-237982 A (Patent literature 1) has been known. According to the conventional method, the operating characteristic is set by measuring the pressure in the conduit, in which the electromagnetic valve is disposed.

CITATION LIST

Patent Literature

Patent Literature 1: JP2004-237982 A

SUMMARY OF INVENTION

Technical Problem(s)

However, according to the above described conventional structure, the pressure change in the conduit which connects the master cylinder and the wheel cylinder upon opening of the electromagnetic valve disposed in the conduit differs depending on the individual cases. Particularly, the pressure in the conduit at the wheel cylinder side relative to the location of the electromagnetic valve may be subject to deviation because of the structural reasons of the wheel cylinder and so on. Accordingly, it is not easy to set precisely the operating characteristic of the electromagnetic valve disposed in the conduit which connects the master cylinder and the wheel cylinder by being influenced by the pressure deviation when using the method disclosed in the Patent Literature 1 as described above.

Accordingly, this invention was made in consideration with the above-mentioned situation and the objective of the invention is to provide a vehicular brake device which can precisely set the operating characteristic of the electromagnetic valve disposed in the conduit which connects the master cylinder and the wheel cylinder.

Solution to Problem(s)

The vehicular brake device according to a first aspect of the invention includes a master cylinder which includes a master chamber connected to a wheel cylinder, a drive pressure chamber which generates a drive pressure for driving a master piston and a hydraulic pressure chamber which generates a hydraulic pressure in response to a stroke position of the master piston, a first electromagnetic valve provided between the master chamber and the wheel cylinder for controlling a flow of brake fluid between the master chamber and the wheel cylinder in response to a supplied electric power, a first flow passage for connecting the first electromagnetic valve and the wheel cylinder, a second flow passage for connecting a reservoir portion which can reserve the brake fluid therein and the first flow passage, a second electromagnetic valve provided in the second flow passage, a second electromagnetic valve control means for controlling the second electromagnetic valve, a drive pressure generating means for generating the drive pressure in the drive pressure chamber, a pressure differential generating means for generating a predetermined pressure differential between a master cylinder side and a wheel cylinder side relative to the first electromagnetic valve, a supplied electric power control means for controlling the supplied electric power to the first electromagnetic valve to be decreased or increased under a state that the predetermined pressure differential is generated, a hydraulic pressure detecting means for detecting whether or not the hydraulic pressure becomes equal to or more than a predetermined pressure or whether or not a change range of the hydraulic pressure becomes equal to or more than a predetermined range in response to a decrease or an increase of the supplied electric power, a supplied electric power detecting means for detecting the supplied electric power to the first electromagnetic valve when the hydraulic pressure detecting means detects that the hydraulic pressure becomes equal to or more than the predetermined pressure or the hydraulic pressure detecting means detects that the change range of the hydraulic pressure is equal to or more than the predetermined range and an operating characteristic setting means for setting an operating characteristic which is a relationship between the supplied electric power to the first electromagnetic valve in the first electromagnetic valve and a pressure differential between the master cylinder side and the wheel cylinder side relative to the first electromagnetic valve, based on the supplied electric power detected by the supplied electric power detecting means, wherein the wheel cylinder has a characteristic that when a ratio of in-flow amount of the brake fluid flowing into the wheel cylinder relative to an increase amount of a wheel pressure is assumed to be a fluid amount change ratio, the fluid amount change ratio in a low pressure side area in which the wheel pressure is defined to be from an initial pressure to a first pressure which is higher than the initial pressure, is higher than the fluid amount change ratio in a high pressure side area in which the wheel pressure is defined to be from a second pressure which is higher than the first pressure to a third pressure which is higher than the second pressure, the hydraulic pressure chamber has a characteristic that when a ratio of increase amount of the hydraulic pressure relative to an advancement amount of the master piston is assumed to be a pressure change ratio, the pressure change ratio in an initial side area in which a position of the master piston is defined to be from an initial position to a first stroke position which is more advanced side than the initial position, is smaller than the pressure change ratio in an advanced side area in which the position of the master piston is defined to be from a second stroke position which is more advanced side than the first stroke position to a third stroke position which is more advanced side than the second stroke position, the pressure differential generating means generates the predetermined pressure differential by moving the master piston by the drive pressure generating means, after an execution of an advancement control to advance the master piston so that the master piston is positioned at a stroke position within the advanced side area and the second electromagnetic valve control means controls the second electromagnetic valve to be in an open state for a period including at least a portion of time of an execution period of the advancement control.

The vehicular brake device according to a second aspect of the invention further includes a flowing out portion which flows the brake fluid out of the reservoir portion towards the master chamber side relative to the first electromagnetic valve and a flowing out portion control means for controlling the flowing out portion to flow a predetermined amount of the brake fluid out of the reservoir portion towards the master chamber side relative to the first electromagnetic valve, when the hydraulic pressure detecting means detects that the hydraulic pressure becomes equal to or more than the predetermined pressure or that the change range of the hydraulic pressure becomes equal to or more than the predetermined range in response to the decrease or the increase of the supplied electric power, wherein the predetermined amount of the brake fluid corresponds to a fluid amount of the brake fluid flowing into the reservoir portion by the advancement control and the second electromagnetic valve control means controls the second electromagnetic valve to be in an open state in the execution period of the advancement control.

The vehicular brake device according to a third aspect of the invention is characterized in that in the first or the second aspect, the second electromagnetic control valve is a normally closed valve which closes under non-energized state.

The vehicular brake device according to a fourth aspect of the invention is characterized in that in any one of the first through third aspects above, the second electromagnetic valve control means controls the second electromagnetic valve to be in the open state during an execution of a decrease or an increase control of the supplied electric power to the first electromagnetic valve.

The vehicular brake device according to a fifth aspect of the invention further includes, in any one of the first through fourth aspects, a pressure adjusting means disposed between the master chamber and the wheel cylinder for adjusting the wheel pressure and wherein the pressure adjusting means includes the first electromagnetic valve, the second electromagnetic valve, the reservoir portion and the flowing out portion which flows the brake fluid out of the reservoir portion towards the master chamber side relative to the first electromagnetic valve.

According to the vehicular brake device of the first aspect of the invention, the operating characteristic can be obtained based on the hydraulic pressure in the hydraulic pressure chamber in which the hydraulic pressure corresponding to the stroke amount of the master piston is generated. It is noted here that the hydraulic pressure chamber can be formed with a simple structure, simpler than those of the master cylinder and the wheel cylinder. Accordingly, the hydraulic pressure therein has less deviation among individual bodies compared to the fluid pressure in the conduit in which the electromagnetic valve is provided. According to the vehicular brake device of the first aspect of the invention, the operating characteristic of the electromagnetic valve can be more precisely set by reducing the influence of the pressure deviation among the individual bodies upon setting the operating characteristic, based on the pressure change upon opening of the electromagnetic valve.

Further, according to the vehicular brake device of the first aspect of the invention, the supplied electric power supplied to the first electromagnetic valve can be detected with accuracy when the hydraulic pressure changes equal to or more than the predetermined range, due to a larger change of the f hydraulic pressure relative to the displacement amount of the master piston upon opening of the first electromagnetic valve.

It is noted here that when the master piston advances upon advancement control, the brake fluid in the master chamber flows out towards the wheel cylinder side relative to the first electromagnetic valve. In a conventional case, in other words, in a case where no reservoir portion and no second electromagnetic valve are provided, or in a case where the second electromagnetic valve is under a closed state, the brake fluid flown out of the master chamber is introduced into the wheel cylinder via the first electromagnetic valve and the first flow passage. The wheel cylinder is configured to have an operating characteristic that the fluid amount change ratio in the high pressure side area is lower than the ratio in the low pressure side area. Accordingly, by execution of the advancement control, the brake fluid is introduced into the wheel cylinder and the wheel cylinder pressure is increased, so that the fluid amount change ratio would become the change ratio in the high pressure side area.

The vehicular brake device according to the first aspect of the invention includes the second electromagnetic valve and the reservoir portion and the second electromagnetic valve becomes an open state at least for a portion of time of the period of the advancement control. Thereby, the brake fluid flows out of the maser chamber while the second electromagnetic valve is in the open state flows into the reservoir via the second flow passage. Accordingly, the brake fluid is restrained from flowing into the wheel cylinder during the advancement control and thereby, the apparent fluid amount change ratio of the wheel cylinder can be kept to be the ratio in the low pressure side area.

In other words, according to the structure of the first aspect, the advancement amount of the master piston becomes great when the first electromagnetic valve is open and the pressure change amount of the fluid pressure chamber becomes great. For example, upon the first electromagnetic valve being open, the brake fluid amount flowing into the wheel cylinder differs depending on the vehicle type, but according to the structure of the invention of this aspect, the hydraulic pressure change upon the first electromagnetic valve being open becomes great even in a vehicle with characteristic of the brake fluid amount flowing into the wheel cylinder being less. Therefore, according to the invention, it is possible to precisely detect the change of the hydraulic pressure in the hydraulic pressure chamber when the first electromagnetic valve is open regardless the difference of individuals of a vehicle or the difference in the vehicle type. In other words, according to the invention, the valve opening electric current of the first electromagnetic valve, for example, can be with accuracy detected to precisely obtain the operating characteristic of the first electromagnetic valve. Further, the servo pressure during the advancement control can be minimized to thereby minimize the servo pressure upon generating of the pressure differential.

The vehicular brake device according to the second aspect of the invention drives the flowing out portion by the necessary minimum electric power which needs to return the reservoir portion to be the original state (state before the execution of the advancement control) by pumping up the brake fluid in the reservoir portion. Thus, the increase of the electricity consumption can be prevented, while obtaining the operating characteristic of the first electromagnetic valve.

According to the vehicular brake device of the third aspect of the invention, since the normal closed type electromagnetic valve structure is used for the second electromagnetic valve, the increase of the electricity consumption can be prevented by energizing the second electromagnetic valve only in the opening period, i.e., for a period including at least a portion of time of the execution period of advancement control.

According to the vehicular brake device of the fourth aspect of the invention, the brake fluid flowing out of the master chamber can be introduced into the reservoir portion as long as the capacity of the reservoir portion permits, upon the opening of the first electromagnetic valve by keeping the second electromagnetic valve to be in the open state during the execution of the control by the supplied electric power control means. In other words, the advancement amount of the master piston becomes great upon the opening of the first electromagnetic valve, and as a result, the change amount of the hydraulic pressure upon the opening of the first electromagnetic valve becomes great to thereby with accuracy detect the valve opening timing of the first electromagnetic valve. According to the fourth aspect of the invention, for example, the valve opening electric current of the first electromagnetic valve can be with accuracy detected and the operating characteristic of the first electromagnetic valve can be obtained with accuracy.

According to the vehicular brake device of the fifth aspect, it is not necessary to additionally provide a new component for preventing the flowing of the brake fluid into the wheel cylinder accompanied by the advancement control by utilizing the electromagnetic valve and the reservoir portion which are normally equipped with an existing pressure adjusting device. Thus the number of components for the device can be reduced to prevent increase of manufacturing cost.

BRIEF EXPLANATION OF ATTACHED DRAWINGS

EMBODIMENTS FOR IMPLEMENTING INVENTION

The embodiments of the invention will be explained hereinafter with reference to the attached drawings. It is noted that each drawing illustrates a conceptual view of the invention and does not define sizes and dimensions of each detail structure

First Embodiment

Figure 1:
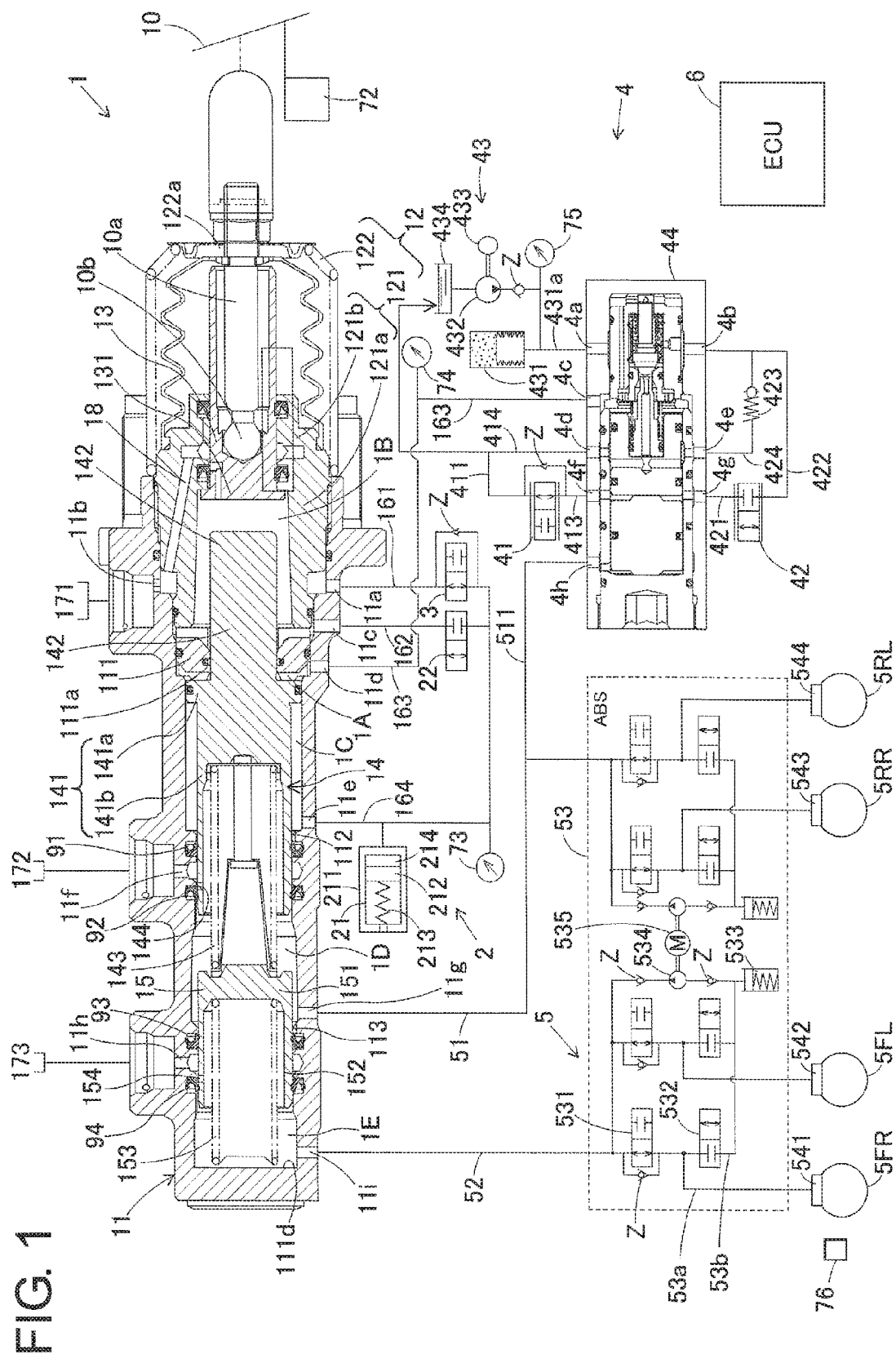
FIG. 1 is a partial sectional view for explanation, showing the structure of the vehicular brake device according to a first embodiment of the invention.

The vehicular brake device according to the first embodiment of the present invention includes, as shown in FIG. 1, mainly a master cylinder 1, a reaction force generating device 2, a third electromagnetic valve 22, a fourth electromagnetic valve 3, a servo pressure generating device (corresponding to a "drive pressure generating means") 4, a brake actuator 5, a brake ECU 6 and various sensors 72 through 75 which are communicable with the brake ECU 6. A known hybrid ECU (not shown) is connected to the brake ECU 6 according to this embodiment.

(Master Cylinder 1)

The master cylinder 1 supplies the brake actuator 5 with the brake fluid and is formed mainly by a main cylinder 11, a cover cylinder 12, an input piston 13, a first master piston 14 and a second master piston 15.

The main cylinder 11 is formed approximately in a bottomed cylinder shape, open at one end and having a bottom surface at the other end thereof. The master cylinder 1 will be explained hereinafter so that that the opening side of the main cylinder 11 is assumed to be the rearward and the bottom surface side of the main cylinder 11 is assumed to be the frontward. The main cylinder 11 includes therein an inner wall portion 111, which divides the inner portion of the main cylinder 11 into the opening side and the bottom surface side. The inner wall portion 111 is provided with a through hole 111a at a central portion thereof, axially (in front/rear direction) penetrating through the inner wall portion 111.

The main cylinder 11 is provided therein at portions closer to the front end than the position of the inner wall portion 111 with small diameter portions 112 (front side) and 113 (rear side). The small diameter portions 112 and 113 project annularly from the inner peripheral surface of the main cylinder 11 at axial portions thereof. The first and the second master pistons 14 and 15 are axially slidably disposed inside of the main cylinder 11. Ports connecting the inside and outside of the main cylinder 11 will be explained later.

The cover cylinder 12 includes an approximately cylindrical portion 121 and a cup-shaped spring portion 122. The cylindrical portion 121 is arranged at a rear end of the main cylinder 11 and is coaxially fitted into the opening of the main cylinder 11. An inner diameter of a front portion 121a of the cylindrical portion 121 is formed to be greater than an inner diameter of a rear portion 121b. Further, the inner diameter of the front portion 121a is formed to be larger than an inner diameter of the through hole 111a.

The spring portion 122 is assembled to the rear end portion of the main cylinder 11 and the outer peripheral surface of the cylindrical portion 121 such that the opening of the main cylinder 11 and the rear end side opening of the cylindrical portion 121 are closed thereby. A through hole 122a is formed at the bottom wall of the spring portion 122. The spring portion 122 is formed by an elastic member which is extendable in an axial direction and the bottom wall thereof is biased in a rearward direction.

The input piston 13 is a piston configured to slidably move inside the cover cylinder 12 in response to an operation of the brake pedal 10. The input piston 13 is formed approximately in a bottomed cylinder shape having a bottom surface at a front portion thereof and an opening at a rear portion thereof. A bottom wall 131 forming the bottom surface of the input piston 13 has a greater diameter than the diameter of the other portions of the input piston 13. The input piston 13 is arranged so that the bottom wall 131 is located at a rear end of the front portion of the cylindrical portion 121 and the input piston 13 is slidably and fluid-tightly movable in an axial direction in an inner peripheral surface of the rear portion 121b of the cylindrical portion 121.

The operating rod 10a and a pivot 10b of the brake pedal 10 are arranged inside of the input piston 13. The operating rod 10a extends outwardly through the opening of the input piston 13 and a through hole 122a of the spring portion 122 and is connected to the brake pedal 10. The operating rod 5a moves in association with the operation of the brake pedal 10 and advances forward by compressing the spring portion 122 in an axial direction when the brake pedal 10 is depressed. In accordance with the advancement movement of the operating rod 10a, the input piston 13 also advances.

The first master piston 14 is arranged in the main cylinder 11 and is slidably movable in the axial direction. The first master piston 14 includes a first main body portion 141 and a projection portion 142. The first main body portion 141 is arranged in coaxial with the main cylinder 11 at a front side of the inner wall portion 111. The first main body portion 141 is formed approximately in a bottomed cylinder shape having an opening at a front portion thereof and a bottom wall 141a at a rear portion thereof. In other words, the first main body portion 141 is formed by the bottom wall 141a and a peripheral wall portion 141b.

The bottom wall 141a is provided at the frontward of the inner wall portion 111 and is slidable in an axial direction and is fluid-tightly arranged. The peripheral wall portion 141b is formed to be of cylindrical shape having a diameter smaller than that of the bottom wall 141a. The peripheral wall portion 141b extends frontward from the front end surface of the bottom wall 141a to be coaxial with the main cylinder 11. The frontward portion of the peripheral wall portion 141b is arranged in the small diameter portion 112 and is slidably movable in an axial direction and is fluid-tightly arranged. The rearward portion of the peripheral wall portion 141b is separated from the inner peripheral surface of the main cylinder 11.

The projection portion 142 is a portion with columnar shape projecting from the center of the end surface of the bottom wall 141a of the first main body portion 141 and extending in a rearward direction. The projection portion 142 is disposed in the through-hole 111a of the inner wall portion 111 and slidably movable relative thereto in an axial direction and is fluid-tightly disposed in the through hole 111a. The rearward portion of the projection portion 142 is positioned inside of the cylinder portion 121 through the through hole 111a, separating from the inner peripheral surface of the cylindrical portion 121. The rear end surface of the projection portion 142 is separated from the bottom wall 131 of the input piston 13 by a predetermined distance. The first master piston 14 is biased by a biasing member 143 formed by a spring or the like towards the rearward direction.

A "servo chamber 1A" (corresponding to the "drive pressure chamber") is defined by the rear end surface of the bottom wall 141a of the first main body 141, the front end surface of the inner wall portion 111, the inner peripheral surface of the main cylinder 11 and the outer peripheral surface of the projection portion 142. A "first fluid pressure chamber 1B" is defined by the rear end surface of the inner wall portion 111, the outer surface of the input piston 131, the inner peripheral surface of the front portion 121a of the cylindrical portion 121 and the outer surface of the projection portion 142. A "second fluid pressure chamber 10" (corresponding to the hydraulic pressure chamber") is defined by the front end surface of the bottom wall 141a, the rear end surface (including the seal member 91) of the small diameter portion 112, the outer peripheral surface of the peripheral wall portion 141b and the inner peripheral surface of the main cylinder 11.

The second master piston 15 is arranged within the main cylinder 11 coaxially with the first master piston 14 at a location forward of the first master piston 14. The second master piston 15 is formed with approximately a cylindrical shape having an opening at a front portion thereof and a bottom wall 151 at a rear portion. In other words, the second master piston 15 includes the bottom wall 151 and a peripheral wall portion 152, diameter of which is equal to the diameter of the bottom wall 151. The bottom wall 151 is arranged between the small diameter portions 112 and 113 at the frontward of the first master piston 14. The rear portion of the second master piston 15 including the bottom wall 151 is separated from the inner peripheral surface of the main cylinder 11. The peripheral wall portion 152 is formed to be cylindrical and extends frontward from the bottom wall 151 coaxially therewith. The peripheral wall portion 152 is arranged in the small diameter portion 113 and is slidably movable in an axial direction and is fluid-tightly arranged therein. The second master piston 15 is always biased rearward by a biasing member 153 formed by a spring or the like.

A "first master chamber 1D" is defined by a space enclosed by an outer surface of the second master piston 15, a front end surface of the first master piston 14, an inner surface of the first master piston 15, a front end surface (including the seal member 92) of the small diameter portion 112, a rear end surface (including the seal member 93) of the small diameter portion 113 and an inner peripheral surface of the main cylinder 11 between the small diameter portions 112 and 113. A "second master chamber 1E" is defined by a space enclosed by the inner bottom surface 111d of the main cylinder 11, the front end surface of the second master piston 15, the inner surface of the second master piston 15, the front end surface (including the seal member 94) of the small diameter portion 113 and the inner peripheral surface of the main cylinder 11.

The area of the rear end surface of the bottom wall 141a (i.e., the area facing to the servo chamber 1A) is designed to be greater than the area of the front end surface of the peripheral wall portion 141b (i.e., the area facing to the first master chamber 1D).

Ports 11a to 11i, which connect the inside and the outside of the master cylinder 1, are formed at the master cylinder 1. The port 11a is formed at a location rearward of the inner wall portion 111 at the main cylinder 11. The port 11b is formed at the main cylinder 11 opposite to the port 11a at approximately the same location in the axial direction. The port 11a and the port 11b are in communication through an annular clearance formed between the inner circumferential surface of the main cylinder 11 and the outer circumferential surface of the cylindrical portion 121. The port 11a is connected to a conduit 161 and the port 11b is connected to a reservoir 171. Therefore, the port 11a is in fluid communication with the reservoir 171.

The port 11b is in communication with the first fluid pressure chamber 1B via a passage 18 formed at the cylindrical portion 121 and the input piston 13. The fluid communication through the passage 18 is interrupted when the input piston 13 advances forward. In other words, when the input piston 13 advances forward, the fluid communication between the fluid pressure chamber 1B and the reservoir 171 is interrupted.

The port 11c is formed at a location rearward of the inner wall portion 111 and forward of the port 11a and the port 11c connects the first fluid pressure chamber 1B with a conduit 162. The port 11d is formed at a location forward of the port 11c and connects the servo chamber 1A with a conduit 163. The port 11e is formed at a location forward of the port 11d and connects the second fluid pressure chamber 1C with a conduit 164.

The port 11f is formed between the sealing members 91 and 92 provided at the small diameter portion 112 and connects a reservoir 172 with the inside of the main cylinder 11. The port 11f is in communication with the first master chamber 1D via a passage 144 formed at the first master piston 14. The passage 144 is formed at a location somewhat rearward of the seal member 92, where the port 11f and the first master chamber 1D are disconnected from each other when the first master piston 14 advances forward.

The port 11g is formed at a location forward of the port 11f and connects the first master chamber 1D with a conduit 51. The port 11h is formed between the sealing members 93 and 94 provided at the small diameter portion 113 and connects a reservoir 173 with the inside of the main cylinder 11. The port 11h is in communication with the second master chamber 1E via a passage 154 formed at the second master piston 15. The passage 154 is formed at a location somewhat rearward of the seal member 94, where the port 11h and the second master chamber 1E are disconnected from each other when the second master piston 15 advances forward. The port 11i is formed at a location forward of the port 11h and connects the second master chamber 1E with a conduit 52.

A plurality of sealing members, such as O-ring seals or the like (see black dots in the drawings) is appropriately provided within the master cylinder 1. The sealing members 91 and 92 are provided at the small diameter portion 112 and are in fluid-tightly contact with the outer circumferential surface of the first master piston 14. Similarly, the sealing members 93 and 94 are provided at the small diameter portion 113 and are in fluid-tightly contact with the outer circumferential surface of the second master piston 15. Additionally, sealing members are provided between the input piston 13 and the cylindrical portion 121. A stroke sensor 72 is a sensor which detects the stroke amount (operating amount) of the brake pedal 10. The detection result will be sent to the brake ECU 6.

(Reaction Force Generating Device 2)

The reaction force generating device 2 includes a stroke simulator 21. The stroke simulator 21 generates a reaction force pressure in the first fluid pressure chamber 1B and the second fluid pressure chamber 1C in response to the operation of the brake pedal 10. The stroke simulator 21 is configured in such a manner that a piston 212 is fitted into a cylinder 211 while being allowed to slidably move therein. The piston 212 is biased in the frontward direction by a compression spring 213 and a pilot hydraulic chamber 214 is formed at a location frontward of the piston 212. The stroke simulator 21 is connected to the second fluid pressure chamber 10 via a conduit 164 and the port 11e, and is connected further to the third electromagnetic valve 22 and the fourth electromagnetic valve 3. A fluid pressure is generated in the second fluid pressure chamber 10 corresponding to the stroke position of the first master piston 14. It may be said that the fluid pressure is generated in the second fluid pressure chamber 10 which corresponds to the displacement amount of the first master piston 14.

It is noted here that the ratio of increase amount of the fluid pressure (hereinafter, this may be referred to also as "hydraulic pressure") in the second fluid pressure chamber 10 relative to the advancement amount of the first master piston 14 is referred to as "pressure change ratio". In other words, the fluid pressure in the second fluid chamber 10 may be said to be the fluid pressure (reaction force pressure) of the stroke simulator 21. Further, the area defined to be from the initial position of the first master piston 14 to the first stroke position which is more advanced side position than the initial position is referred to as "initial side area" and the area defined to be from the second stroke position which is more advanced side position than the first stroke position to the third stroke position which is more advanced side position than the second stroke position is referred to as the "advanced side area".

Figure 2:
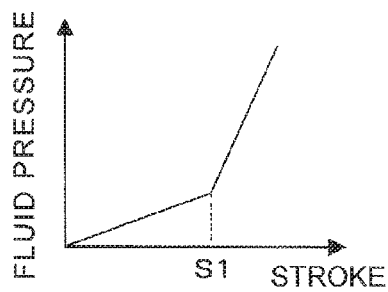
FIG. 2 is a conceptual view explaining the characteristic of stroke simulator.

The stroke simulator 21 has a characteristic that the pressure change ratio in the initial side area is smaller than the pressure change ratio in the advanced side area as shown in FIG. 2, the characteristic being as same as the characteristic exhibited by a widely used stroke simulator. Similarly, the second fluid pressure chamber 10 connected to the stroke simulator 21 has a characteristic that the pressure change ratio in the initial side area is smaller than the pressure change ratio in the advanced side area. In other words, the second fluid pressure chamber 10 has a characteristic that the pressure change amount relative to the stroke amount is larger in the area where the stroke amount from the initial position is equal to or more than the value S1 than in the area where the stroke amount is less than the value S1. The second fluid pressure chamber 10 has a first stroke position, a second stroke position and a third stroke position due to the characteristic reasons thereof in the relationship between the pressure and the stroke. According to this embodiment, the position of the second stroke is in the area where the stroke amount from the initial position is equal to or more than the value S1.

As shown in FIG. 2, according to the above characteristic of the embodiment, under the relationship between the fluid pressure in the second fluid chamber 10 and the stroke position, a constant inclination is indicated from the initial position to the stroke position S1 (initial side inclination) and another constant inclination with a value larger than the initial side inclination in the area where the stroke position is located in more advanced side than the stroke position S1. The above relationship according to this embodiment is established by a combination of two direct functions (two proportional relationships). Such relationship according to the invention may be allowable to include the case where a quadric function is included or two or more functions are combined, under the condition that the pressure change ratio in the advanced side is large.

(Third Electromagnetic Valve 22)

The third electromagnetic valve 22 is a normally closed type electromagnetic valve, the opening and closing operations being controlled by the brake ECU 6. The third electromagnetic valve 22 is connected to the conduits 164 and 162 to have the conduits 164 and 162 to be in connected state or in disconnected state. In other words, the third electromagnetic valve 22 is an opening/closing (switching) valve which connects or disconnects the first and the second fluid pressure chambers 1B and 1C.

The pressure sensor 73 is a sensor which mainly detects the pressure (reaction force pressure) in the fluid pressure chambers 1B and 10 and is connected to the conduit 164. The pressure sensor 73 detects the pressure in the fluid pressure chambers 1B and 10 when the third electromagnetic valve 22 is in the open state and detects the pressure in the second fluid pressure chamber 10 (corresponding to the hydraulic pressure) when the third electromagnetic valve 22 is in the closed state (Fourth Electromagnetic Valve 3)

The fourth electromagnetic valve 3 is normally open type electromagnetic valve whose opening and closing operations are controlled by the brake ECU 6. The fourth electromagnetic valve 3 is connected to the conduits 164 and 161 to have the conduits 161 and 164 to be in connected state or in disconnected state. The fourth electromagnetic valve 3 connects or disconnects the fluid pressure chambers 1B and 1C and the reservoir 171.

(Servo Pressure Generating Device 4)

The servo pressure generating device 4 is formed mainly by a pressure decreasing valve 41, a pressure increasing valve 42, a pressure supplying portion 43 and a regulator 44. The pressure decreasing valve 41 is a normally open type electromagnetic valve and the flow rate thereof is controlled by the brake ECU 6. One end of the pressure decreasing valve 41 is connected to the conduit 161 via the conduit 411 and the other end thereof is connected to the conduit 413. In other words, the one end of the pressure decreasing valve 41 is connected to the reservoir 171 via the conduits 411 and 161 and the ports 11a and 11b. The pressure increasing valve 42 is a normally closed type electromagnetic valve and the flow-rate thereof is controlled by the brake ECU 6. One end of the pressure increasing valve 42 is connected to the conduit 421 and the other end thereof is connected to the conduit 422.

The pressure supplying portion 43 is a portion for supplying the regulator 44 with a highly pressurized brake fluid in response to the instructions from the brake ECU 6. The pressure supplying portion 43 includes mainly an accumulator 431, a fluid pressure pump 432, a motor 433 and a reservoir 434.

The accumulator 431 accumulates a hydraulic pressure generated by the operation of the fluid pressure pump 432. The accumulator 431 is connected to the regulator 44, fluid pressure sensor 75 and the fluid pressure pump 432 via a conduit 431a. The fluid pressure pump 432 is connected to the motor 433 and the reservoir 434. The fluid pressure pump 432 is driven by the motor 433 to supply the accumulator 431 with the brake fluid reserved in the reservoir 434. The pressure sensor 75 detects the pressure in the accumulator 431.

When the pressure sensor 75 detects that the accumulator pressure drops to a value equal to or lower than a predetermined value, the motor 433 is driven on the basis of a control signal from the brake ECU 6 and the fluid pressure pump 432 supplies the accumulator 431 with the brake fluid to supplement the pressure energy.

Figure 3:
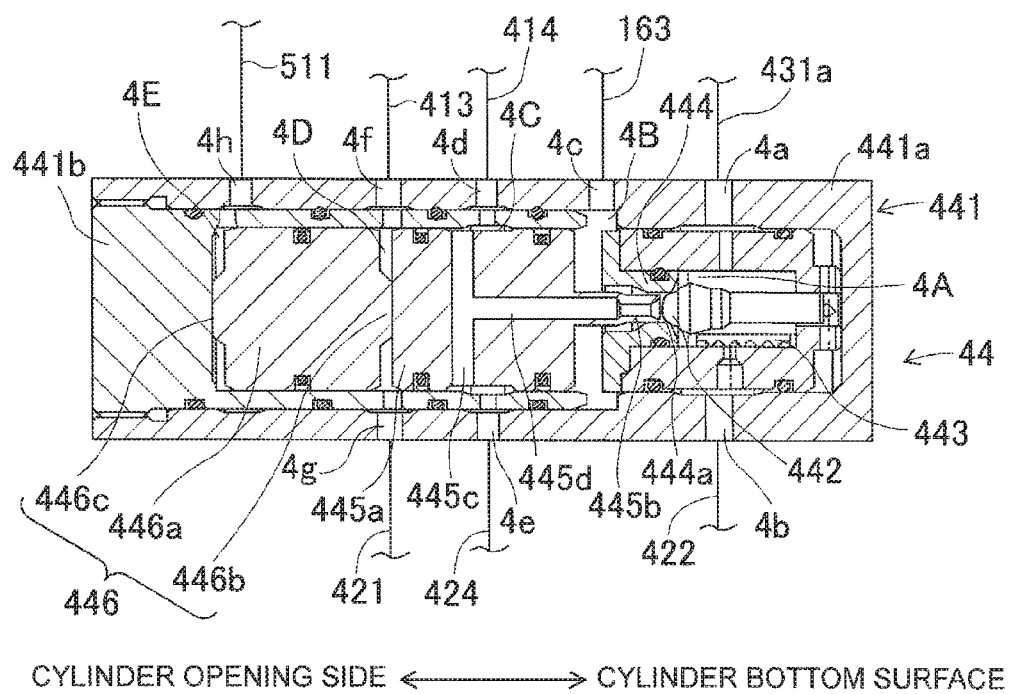
FIG. 3 is a partial sectional view for explanation, showing the structure of the regulator according to the first embodiment of the invention.

The regulator 44 is formed by a widely used regulator with a main addition of a sub piston 446. As shown in FIG. 3, the regulator 44 includes mainly a cylinder 441, a ball valve 442, a biasing portion 443, a valve seat portion 444, a control piston 445 and the sub piston 446.

The cylinder 441 includes a cylinder case 441a formed approximately in a bottomed cylindrical shape having a bottom surface at one end thereof (at the right side in the drawing) and a cover member 441b closing an opening side of the cylinder case 441a (at the left side in the drawing). As shown in the drawing, the cover member 441b is of C-shape in cross section but for an explanation purpose, the cover member 441b is of a columnar shape and a portion covering the opening of the cylinder case 441 is indicated as the cover member 441b. The cylinder case 441a is provided with a plurality of ports 4a through 4g, through which the inside and the outside of the cylinder case 441a are in communication.

The port 4a is connected to the conduit 431a. The port 4b is connected to the conduit 422. The port 4c is connected to a conduit 163. The port 4d is connected to the reservoir 434 via the conduit 414. The port 4e is connected to the conduit 424 which is connected to the conduit 422 via the relief valve 423. The port 4f is connected to the conduit 413. The port 4g is connected to the conduit 421. The port 4h is connected to the conduit 511 which is branched from the conduit 51.

The ball valve 442 is a valve having a ball shape and is arranged at the bottom surface side (hereinafter referred to also as a cylinder bottom surface side) of the cylinder case 441a inside of the cylinder 441. The biasing portion 443 is formed by a spring member biasing the ball valve 442 towards the opening side (hereinafter referred to also as a cylinder opening side) of the cylinder case 441a, and is provided at the bottom surface of the cylinder case 441a. The valve seat portion 444 is a wall member provided at the inner peripheral surface of the cylinder case 441a and divides the cylinder into the cylinder opening side and the cylinder bottom surface side. A through passage 444a through which the divided cylinder opening side and the cylinder bottom surface side are in communication is formed at a center of the valve seat portion 444. The valve seat portion 444 supports the ball valve 442 from the cylinder opening side in a manner that the biased ball valve 442 closes the through passage 444a.

A space defined by the ball valve 442, the biasing portion 443, the valve seat portion 444 and the inner circumferential surface of the cylinder case 441a at the cylinder bottom surface side is referred to as a "first chamber 4A". The first chamber 4A is filled with the brake fluid and is connected to the conduit 431a via the port 4a and to the conduit 422 via the port 4b.

The control piston 445 includes a main body portion 445a formed approximately in a columnar shape and a projection portion 445b formed approximately in a columnar shape having a diameter smaller than the main body portion 445a. The main body portion 445a is disposed in the cylinder 441 in a coaxial and fluid-tight manner on the cylinder opening side relative to the valve seat portion 444 and is slidably movable in the axial direction. The main body portion 445a is biased towards the cylinder opening side by means of a biasing member (not shown). A passage 445c is formed at an approximately intermediate portion of the main body portion 445a in a cylinder axis direction and the passage 445c extends in a peripheral direction (in up/down direction in the drawing) to open to the peripheral surface of the main body 445a at the both ends thereof. A portion of an inner circumferential surface of the cylinder 441 corresponding to an opening position of the passage 445c is provided with the port 4d and is formed to be recessed to form the recessed space portion which forms a "third chamber 4C" with the main body portion 445a.

The projection portion 445b projects towards the cylinder bottom surface side from a center portion of an end surface of the cylinder bottom surface side of the main body portion 445a. The projection portion 445b is formed so that the diameter thereof is smaller than the diameter of the through passage 444a of the valve seat portion 444. The projection portion 445b is coaxially provided relative to the through passage 444a. A tip end of the projection portion 445b is spaced apart from the ball valve 442 towards the cylinder opening side by a predetermined distance. A passage 445d is formed at the projection portion 445b so that the passage 445d extends in the cylinder axis direction and opens at a center portion of an end surface of the cylinder bottom surface side of the projection portion 445b. The passage 445d extends up to the inside of the main body portion 445a and is connected to the passage 445c.

A space defined by the end surface of the cylinder bottom surface side of the main body portion 445a, an outer surface of the projection portion 445b, the inner circumferential surface of the cylinder 441, the valve seat portion 444 and the ball valve 442 is referred to as a "second chamber 4B". The second chamber 4B is in communication with the ports 4d and 4e via the passages 445c and 445d and the third chamber 4C.

The sub piston 446 is formed by a sub main body portion 446a, a first projection portion 446b and a second projection portion 446c. The sub main body portion 446a is formed to be of a columnar shape. The sub main body portion 446a is provided in the cylinder 441 at the cylinder opening side of the main body 445a in coaxial therewith and slidable therein in fluid-tightly in an axial direction.

The first projection portion 446b has a diameter smaller than the diameter of the sub main body portion 446a and is columnar shaped. The first projection portion 446b projects outward from the center of the end surface of the cylinder bottom surface side of the sub main body portion 446a. The first projection portion 446b is in contact with the end surface of the cylinder opening side of the main body portion 445a. The shape of the second projection portion 446c is the same with the first projection portion 446b and is projecting from the center of the end surface of the cylinder opening side of the sub main body portion 446a. The second projection portion 446c is in contact with the cover member 441b.

A pressure control chamber 4D is defined by the space formed by the end surface of the cylinder bottom surface side of the sub main body portion 446a, the outer surface of the first projection portion 446b, the end surface of the cylinder opening side of the control piston 445 and the inner peripheral surface of the cylinder 441. The pressure control chamber 4D is in communication with the pressure decreasing valve 41 via the port 4f and the conduit 413 and is in communication with the pressure increasing valve 42 via the port 4g and the conduit 421.

On the other hand, a space defined by the end surface of the cylinder opening side of the sub main body portion 446a, the outer surface of the second projection portion 446c, the cover member 441b and the inner circumferential surface of the cylinder 441 is referred to as a fourth chamber 4E. The fourth chamber 4E is in communication with the port 11g via the port 4h and the conduits 511 and 51. Each chamber 4A through 4E is filled with the brake fluid. The pressure sensor 74 is a sensor which detects the pressure (servo pressure) of the servo chamber 1A and is connected to the conduit 163.

(Brake Actuator 5)

The brake actuator 5 includes conduits 51 and 52, the ABS (Anti-lock Brake System) (corresponding to the "pressure adjusting means") 53 and the wheel cylinders 541 through 544. The first master chamber 1D and the second master chamber 1E of the master cylinder 1, which generate the master pressure, are connected to the wheel cylinders 541 through 544 via the conduits 51 and 52 and the ABS 53. The wheel cylinders 541 through 544 form the brake actuator which applies the hydraulic pressure braking force (friction braking force) to the wheels 5FR, 5FL, 5RR and 5RL in response to the hydraulic pressure. The port 11g of the first master chamber 1D and the port 11i of the second master chamber 1E are connected to the ABS 53 via the conduits 51 and 52, respectively. The wheel cylinders 541 through 544, which operate the brake actuator which performs braking operation to the wheels 5FR through 5RL, are connected to the ABS 53.

It is noted that the ratio of brake fluid amount flowing into the wheel cylinder relative to the wheel pressure (fluid pressure in the wheel cylinder) increase amount is defined to be the "fluid amount change ratio". It is further noted that the pressure area of the wheel pressure from the initial pressure to the first pressure which is higher than the initial pressure is defined to be the "low pressure side area" and the pressure area of the wheel pressure from the second pressure which is higher than the first pressure to the third pressure which is higher than the second pressure is defined to be the "high pressure side area".

Figure 4:
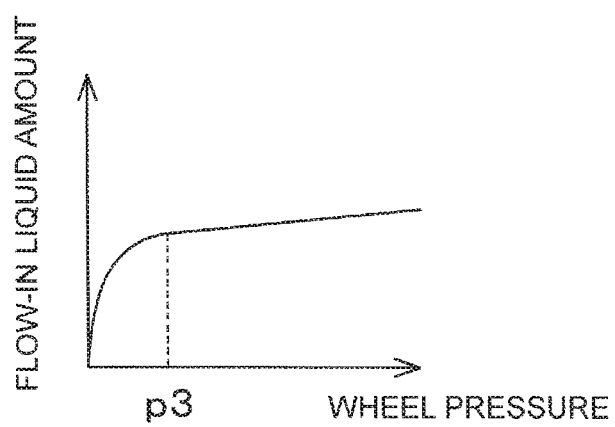
FIG. 4 is a conceptual view explaining the characteristic of wheel cylinder.

The wheel cylinders 541 through 544 have the operating characteristic (P-Q operating characteristics: Pressure-Quantity relationship) that the regular wheel cylinders have, wherein the fluid amount (quantity) change ratio at the low pressure side area is larger than the fluid amount (quantity) change ratio at the high pressure side area as shown in FIG. 4. In other words, the wheel cylinders 541 through 544 have the characteristic that the flow-in fluid amount change relative to the pressure change amount becomes smaller when the wheel pressure is equal to or more than the value "p3" than when the wheel pressure is less than the value "p3". The wheel cylinders 541 through 544 have the first pressure, second pressure and the third pressure by which the P-Q operating characteristic is established.

According to the P-Q operating characteristic of the embodiment above, the relationship between the wheel pressure increase amount and the flow-in fluid amount of the brake fluid indicates that the inclination from the initial pressure (atmospheric pressure) to the predetermined pressure "p3" exhibits a steep inclination (initial inclination) and the inclination is gradually changed from the predetermined pressure "p3" to the high pressure side and is substantially becomes constant with an inclination smaller than the initial inclination. Accordingly, in this embodiment, the above relationship is established by the combination of the area where the fluid pressure change ratio is small and the area where the fluid pressure change ratio is large.

Hereinafter, the explanation of the ABS 53 will be made mainly based on the structure of one wheel (5FR) among the four wheels. The structures of other wheels which are same as that of the one wheel will be omitted. The ABS 53 is formed by a holding valve 531 (corresponding to the first electromagnetic valve), a pressure decreasing valve 532 (corresponding to the second electromagnetic valve), a reservoir 533 (corresponding to the reservoir portion), a pump 534 and a motor 535. The holding valve 531 is a normally open type electromagnetic valve and the opening and closing thereof are controlled by the brake ECU 6. The holding valve 531 is arranged so that one side thereof is connected to the conduit 52 and the other side thereof is connected to the wheel cylinder 541 and the pressure decreasing valve 532.

In more detail, the holding valve 531 of the embodiment is an electromagnetic valve in which a force to interrupt the fluid communication of the fluid passage (for example, a biasing force to push the valve member towards the master cylinder 1 side to close the opening) changes in response to the electricity supplied thereto and the more the electricity is supplied, the larger the force to interrupt the fluid communication of the fluid passage become. When the force applied towards the wheel cylinders 541 through 544 sides from the master cylinder 1 side (i.e., the difference in pressure between the master cylinder 1 side and the wheel cylinders 541 through 544 sides) exceeds the force to interrupt the fluid communication of the fluid passage, the holding valve 531 opens. Thus, the holding valve 531 has the operating characteristic (I-P operating characteristic) that indicates the relationship between the supplied electricity and the pressure differential between the master cylinder 1 side and the wheel cylinder 541 through 544 side when the holding valve 531 opens. The holding valve 531 controls the flow of brake fluid between the master cylinder 1 and the wheel cylinders 541 through 544 in response to the supplied electricity. In parallel with the holding valve 531, there is provided with a check valve "Z" which allows a fluid flow in opposite direction with respect to the holding valve 531.

The pressure decreasing valve 532 is a normally closed type electromagnetic valve and the opening and closing thereof are controlled by the brake ECU 6. Therefore, the pressure decreasing valve 532 is closed under non-energized state. One side of the pressure decreasing valve 532 is arranged to be connected to the wheel cylinder 541 and the holding valve 531 and the other side thereof is connected to the reservoir 533. When the pressure decreasing valve 532 is open, the fluid communication between the wheel cylinder 541 and the reservoir 533 is established. According to this embodiment, the holding valve 531 and the wheel cylinder 541 through 544 are connected by the conduit 53a (corresponding to the first fluid passage) and the conduit 53a and the reservoirs 533 are connected by the conduit 53b (corresponding to the second fluid passage). The pressure decreasing valve 532 is disposed in the conduit 53b for opening and closing the fluid passage of the conduit 53b. It is sufficient that one side of the conduit 53b is directly or indirectly connected to the opening of the wheel cylinder side 541 through 544 with respect to the holding valve 531. In other words, the one side of the conduit 53b is directly or indirectly connected to the conduit 53a.

The reservoir 533 serves as a reservoir for temporarily reserving the brake fluid and is connected to the conduit 52 via the pressure decreasing valve 532 and the pump 534. The pump 534 is connected to the reservoir 533 at the suction port and is connected to the conduit 52 at the discharge port via the check valve "Z". The check valve "Z" allows the flow from the pump 534 to the conduit 52 (second master chamber 1E) but restricts the flow in the opposite direction. The pump 534 is driven by the operation of the motor 535 in response to the instructions from the brake ECU 6. Under the pressure decreasing mode of the ABS control, the pump 535 suctions the brake fluid in the wheel cylinder 541 or the brake fluid reserved in the reservoir 533 and returns the suctioned brake fluid to the second master chamber 1E. It is noted that a damper (not shown) is provided at the upper stream side of the pump 534 to absorb the pulsation of the brake fluid discharged from the pump 534. The pump 534 and the motor 535 form the "flowing out portion" which flows the brake fluid out of the reservoir 533 to the master chamber 1E and 1D side relative to the holding valve 531.

The ABS 53 is provided with a wheel speed sensor 76 which detects the wheel speed. The detection signal which indicates the wheel speed detected by the wheel speed sensor 76 is outputted to the brake ECU 6.

According to thus structured ABS 53, the brake ECU 6 changes the opening and closing states of the electromagnetic valves 531 and 532 based on the master pressure, the wheel speed state and the frontward/rearward acceleration and, when necessary, operates the motor 535 to execute the anti-lock brake control by adjusting the brake fluid pressure to be applied to the wheel cylinder 541, i.e., the braking force to be applied to the wheel 5FR. The ABS 53 is a supply fluid pressure supply device for supplying the wheel cylinders 5FR through 5RL with the brake fluid from the master cylinder 1 by adjusting the supply amount and supply timing based on the instructions from the brake ECU 6.

Under the linear mode (later described), fluid pressure from the accumulator 431 of the servo pressure generating device 4 is controlled by the pressure increasing valve 42 and the pressure decreasing valve 41 and the servo pressure is generated in the servo chamber 1A. Due to this servo pressure generated in the servo chamber 1A, the first and the second master pistons 14 and 15 advance to pressurize the fluid in the first and the second master chambers 1D and 1E. The fluid pressures in the first and the second master chamber 1D and 1E are supplied to the wheel cylinders 541 through 544 as the master cylinder pressure from the ports 11g and 11i via the conduits 51 and 52 and the ABS 53. Thus, the hydraulic pressure braking force is applied to the vehicle wheels 5FR through 5RL.

(Brake ECU 6)

The brake ECU 6 is an electrical control unit and communicates with the sensors 72 through 76 and the hybrid ECU (not shown) for controlling the electromagnetic valves 22, 3, 41, 42, 531 and 532 and motors 433 and 535, so on. The brake ECU 6 memorizes two control modes which are a linear mode and an REG mode. The linear mode means a normal brake control mode and controls the servo pressure in the servo chamber 1A by controlling the pressure decreasing and increasing valves 41 and 42 under the third electromagnetic valve 22 being in the open state and the fourth electromagnetic valve 3 being in closed state. The REG mode means a control mode where the pressure decreasing and increasing valves 41 and 42 and the third and the fourth electromagnetic valves 22 and 3 are controlled to be in non-energized state, or a mode where the electromagnetic valves become non-energized state due to a failure or the like.

(Operation Under Braking Operation)

The operation under the brake operating state will be hereinafter explained. When the brake pedal 10 is depressed, the input piston 13 advances to interrupt the fluid communication of the passage 18 and accordingly to interrupt the communication between the reservoir 171 and the first fluid pressure chamber 1B. Under the linear mode as explained above, since the fourth electromagnetic valve 3 is controlled to be in a closed state and the third electromagnetic valve 22 is controlled to be in an open state, the fluid communication between the fluid pressure chambers 1B and 1C is established but the fluid communication between the both chambers and the reservoir 171 is interrupted. In this state, the stroke simulator 21 generates a reaction force pressure in both chambers 1B and 10 in response to the stroke amount.

Even if the reaction force pressure is generated in the first and the second fluid pressure chambers 1B and 10, such reaction force pressure is counterbalanced by the application thereof both on the rear end surface of the first master piston 14 (rear end surface of the projection portion 142 of the first master piston 14) and on the front end surface of the first master piston 14 (front end surface of the bottom wall 141a of the first master piston 14), both pressure receiving surface areas being set to be equal. Accordingly, the first master piston 14 is operated by the servo pressure. On the other hand, under the REG mode, since the fourth electromagnetic valve 3 is controlled to be in the open state and the third electromagnetic valve 22 is controlled to be in the closed state, the first fluid pressure chamber 1B is in fluid-tight state and the second fluid pressure chamber 10 is in fluid communication with the reservoir 171, the first master piston 14 is operated by the operating force to the brake pedal 10 (depression force) by the operator.

(Operating Characteristic Obtaining Control)

Figure 5:
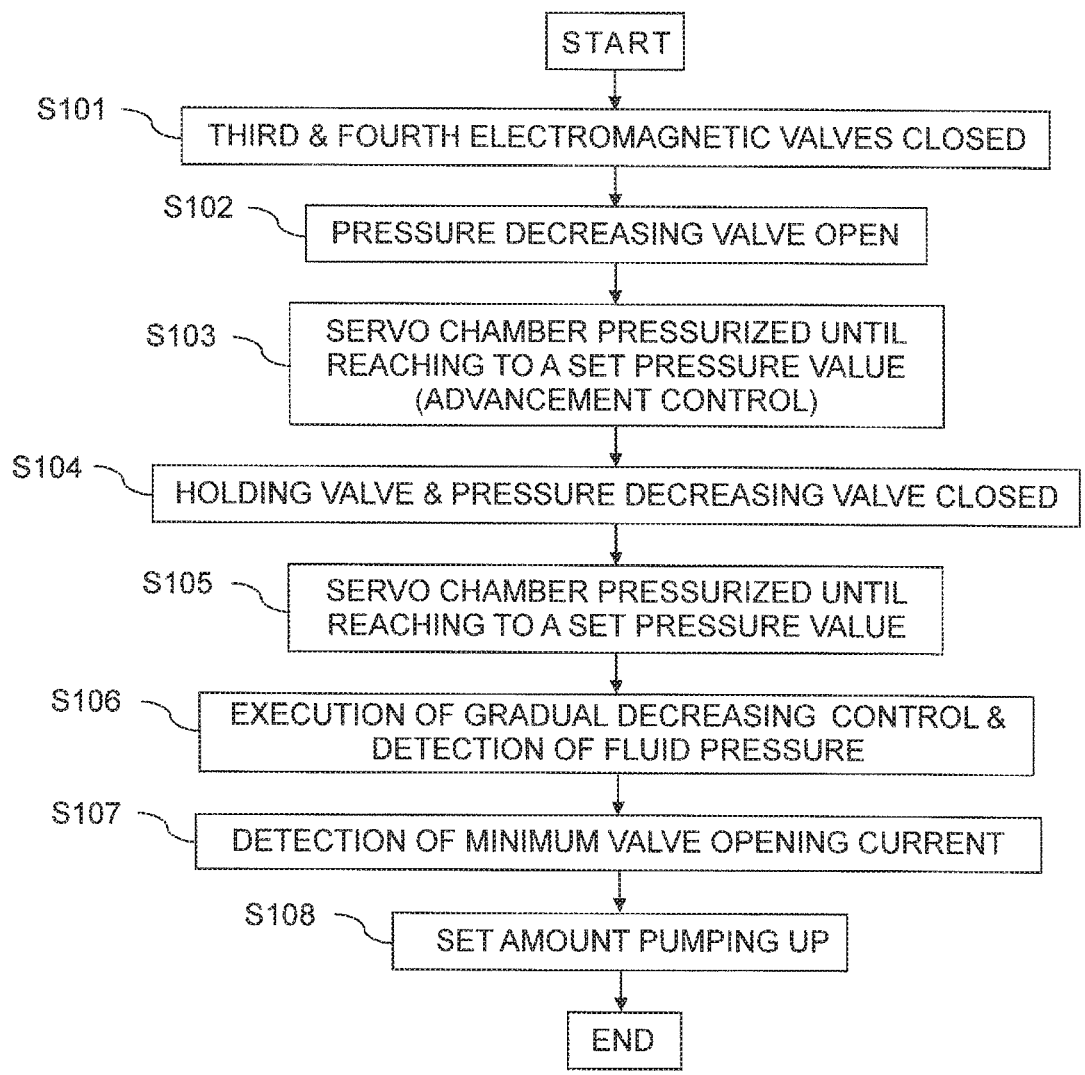
FIG. 5 is a flowchart regarding to the operating characteristic obtaining control according to the first embodiment of the invention.
Figure 6:
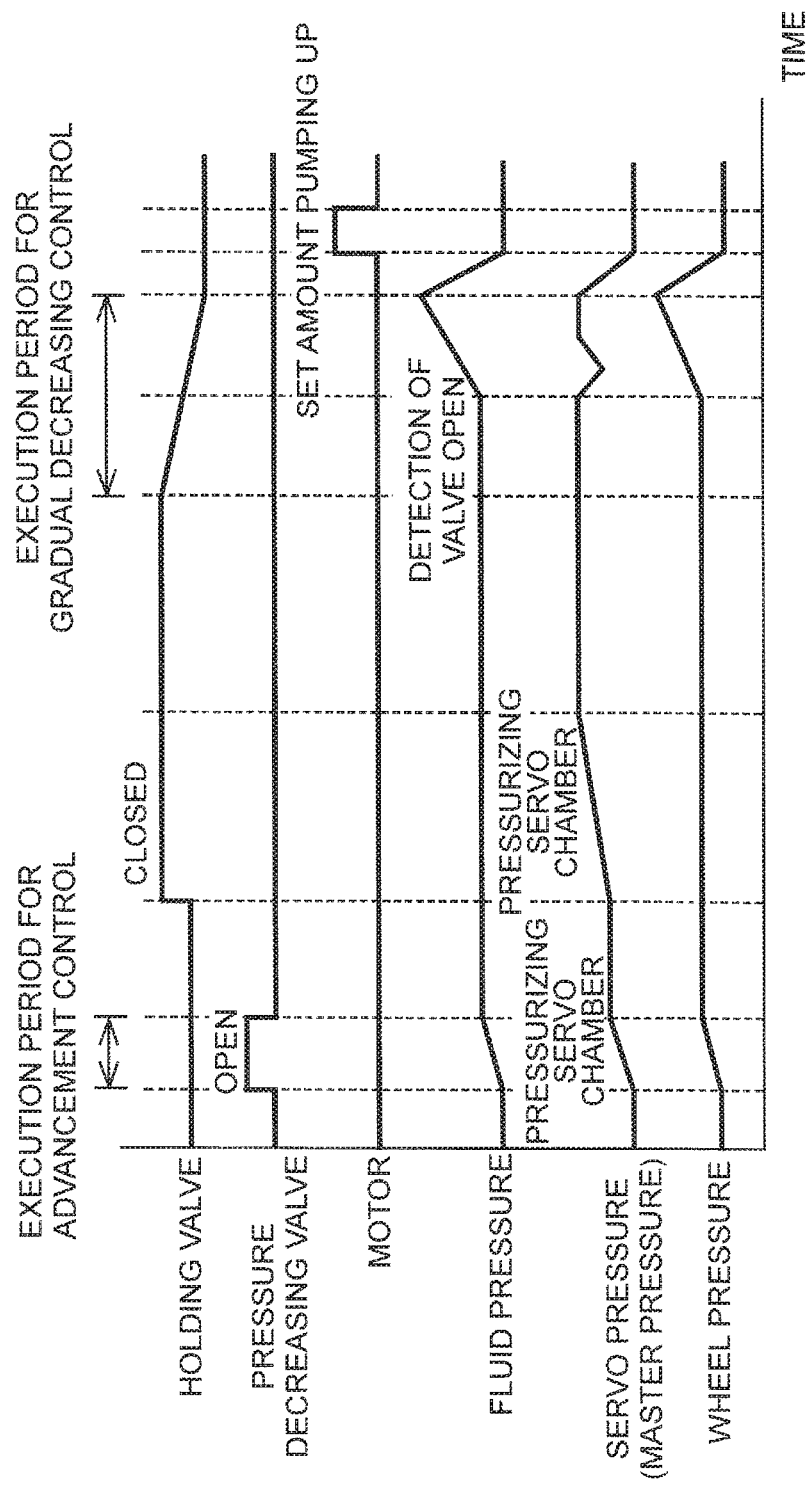
FIG. 6 is a timing chart regarding to the operating characteristic obtaining control according to the first embodiment of the invention.

The method for obtaining the operating characteristic of the holding valve 531 by the brake ECU 6 will be explained hereinafter. As shown in FIGS. 5 and 6, under the operating characteristic obtaining control, the brake ECU 6 closes the third electromagnetic valve 22 and the fourth electromagnetic valve 3 (S101) and opens the holding valve 531 (non-energized state) and also opens the pressure decreasing valve 532 (energized state) (S102).

Next, the brake ECU 6 controls the pressure decreasing and the pressure increasing valves 41 and 42 to raise the servo pressure up to the "predetermined pressure", regardless of the operation of the brake pedal 10 (S103). The "predetermined pressure" is set based on the relationship between the pressure of the stroke simulator 21 and the stroke amount (displacement amount of the first master piston 14). More specifically, the predetermined pressure is set so that the stroke amount of the first master piston 14 becomes equal to or more than the stroke amount "S1" (See FIG. 2).

In other words, the brake ECU 6 raises the servo pressure so that the stroke position of the first master piston 14 is located within the advance side area to have the fluid pressure in the second fluid chamber 1C become equal to or more than a pressure corresponding to the stroke amount S1. By this advancement control by the brake ECU 6, the first master piston 14 advances to enter into the area where the stroke amount is equal to or more than the amount S1. The brake ECU 6 according to this embodiment controls the servo pressure so that the first master piston 14 stops within the advance side area. The "execution period of the advancement control" means the period from the start of increase of the servo pressure to the stop of increase of the servo pressure (servo pressure being maintained) as shown in the step S103.

Next, the brake ECU 6 controls the pressure decreasing valve 532 and the holding valve 531 to be in a closed state (S104). In this step S104, the brake ECU 6 instructs an electric power supply means (not shown) to supply the holding valve 531 with the predetermined amount of electricity to have holding valve 531 to be in closed state. It is noted that the supplied electricity amount to the holding valve 531 is an electric power level that the holding valve 531 would not open, even if a predetermined pressure differential (later will be described) generated between the master chamber 1D and 1E side and the wheel cylinder 541 through 544 side with respect to the holding valve 531. The pressure decreasing valve 532 keeps the open state only during the entire execution period of the advancement control.

Then, the brake ECU 6 controls the servo pressure which corresponds to the pressure in the servo chamber 1A to keep increasing, regardless of whether the brake pedal 10 is depressed or not, by controlling the pressure decreasing and increasing valves 41 and 42 (S105). With the increase of the servo pressure, the master pistons 14 and 15 advance to increase the master pressure. Thus, the predetermined pressure differential is generated between the master cylinder 1 side and the wheel cylinders 541 through 544 side with respect to the holding valve 531 in the closed state. In other words, the brake ECU 6 generates the predetermined pressure differential between the both sides of the holding valve 531. The generated predetermined pressure differential is the difference in hydraulic pressure between the wheel cylinder side and the master cylinder side with respect to the holding valve 531. The brake ECU 6 under this control operation corresponds to the "pressure differential generating means". With respect to the position of the holding valve 531, the pressure at the master cylinder 1 side is higher than the pressure at the wheel cylinder 541 through 544 side.

With the advancement of the first master piston 14, the volume of the second fluid pressure chamber 1C decreases and the brake fluid enters into the stroke simulator 21 to push in the piston 212 against the biasing force of the compression spring 213. Thus, the pressure in the pilot pressure chamber 214, i.e., the pressure in the second fluid pressure chamber 1C becomes high. It is noted that the pressure in the second fluid pressure chamber 1C is measured by the pressure sensor 73.

Figure 7:
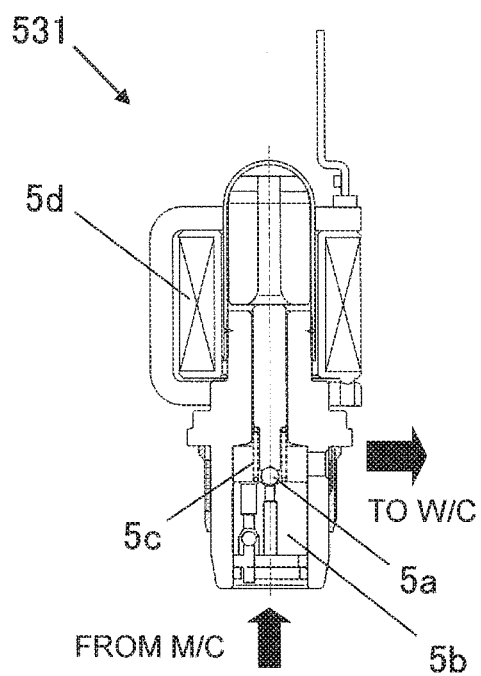
FIG. 7 is a conceptual view explaining the input valve.

Further, the brake ECU 6 after generation of the predetermined pressure differential, gradually decreases the supply amount of electric power to the holding valve 531 (S106). The brake ECU 6 under this operation corresponds to the "supplied electric power control means". The structure of the holding valve 531 will be conceptually explained hereinafter. For example, as shown in FIG. 7, the holding valve 531 includes a valve member 5a which closes the conduit, a valve seat 5b, a biasing member 5c which biases the valve member 5a towards a valve opening direction (in a direction departing from the valve seat 5b) and a solenoid 5d. When the holding valve 531 is under non-energized state, the valve member 5a and the valve seat 5b are separated (i.e., the valve is in an open state) due to the biasing force of the biasing member 5c. When the supplied electric power to the holding valve 531 is increased, the force (electromagnetic driving force) pushing the valve member 5a towards the valve closing direction (in the direction approaching to the valve seat 5b) by the solenoid 5d becomes large and when the supplied electric power to the holding valve 531 is decreased, the force pushing the valve member 5a towards the valve closing direction by the solenoid 5d becomes small. In other words, when the supply amount of the electric power is gradually decreased, the electromagnetic driving force becomes smaller than the pressure differential operating force (strictly, the biasing force of the biasing member 5c is included in this operating force) by the generated predetermined pressure differential at a certain point and thereafter the holding valve 531 becomes in an open state.

When the holding valve 531 is opened, the brake fluid flows from the master cylinder 1 side having a higher pressure to the wheel cylinders 541 through 544 side having a lower pressure. Thus, the master pressure is decreased and the master pistons 14 and 15 advance by the servo pressure. The volume of the second fluid pressure chamber 10 decreases as the advancement of the first master piston 14 and the brake fluid in the second fluid pressure chamber 10 flows into the stroke simulator 21 to push the piston 212 thereby increasing the pressure in the pilot pressure chamber 214. Thus the "fluid pressure" (hydraulic pressure in the second fluid pressure chamber 10) increases. As shown in FIG. 6, according to this embodiment, the fluid pressure in the second fluid chamber 10 is kept constant under the state that the predetermined pressure differential is generated and the hydraulic pressure changes when the holding valve 531 is open under the state that the predetermined pressure differential is generated.

The brake ECU 6 controls the supplied electric power to gradually decrease and at the same time judges whether or not the pressure value of the pressure sensor 73 has reached equal to or more than a threshold value set in advance (predetermined pressure) (S106). The brake ECU 6 under this operation corresponds to the "hydraulic pressure detecting means".

When the pressure value of the pressure sensor 73 becomes equal to or more than the threshold value, the brake ECU 6 detects and memorizes the supplied electric power to the holding valve 531 at the time when the pressure value of the pressure sensor 73 becomes equal to or more than the threshold value (S107). The brake ECU 6 under this operation corresponds to the "supplied electric power detecting means". Thus, the valve opening electric current, valve opening voltage or the valve opening electric power of the holding valve 531 relative to the predetermined pressure differential can be obtained. It is noted that in this description of the present invention, "control of supplied electric power" is a conceptual expression which includes both electric current control and voltage control of the supplied electric power and the "detection of the supplied electric power" is a conceptual expression which includes the detection of supplied electric current and the detection of supplied voltage. According to this embodiment, the brake ECU 6 controls the electric current value to the holding valve 531 to increase or to decrease so as to obtain the valve opening electric current "I1" relative to the predetermined pressure differential "P1".

Next, the brake ECU 6 drives the motor 535 to operate the pump 534 to pump up the predetermined amount of brake fluid set in advance from the reservoir 533. The pumped up brake fluid is discharged to the master chambers 1D and 1E side (S108). According to this embodiment, the predetermined fluid amount (it is also referred to as "flow-in fluid amount at the time of advancement control") of the brake fluid is set to the fluid amount flown into the reservoir 533 during the advancement control execution period. The flow-in fluid amount at the time of advancement control can be calculated, for example, by the pressure (reference pressure for the predetermined pressure differential) generated at the wheel cylinder 541 through 544 side by the advancement control and the P-Q operating characteristic of the reservoir 533. The valve opening period (time) of the pressure decreasing valve 532 during the advancement control execution may be used, for example, for the calculation of the flow-in fluid amount at the time of advancement control.

As similar to the control as stated above, another valve opening electric current "I2" at the pressure differential P2 is obtained to thereby calculate the operating characteristic (I-P operating characteristic) of the holding valve 531. By obtaining the respective valve opening electric currents at two or more pressure differential values, more accurate operating characteristic can be calculated. The brake ECU 6 presumes the operating characteristic based on the valve opening electric currents at the memorized two or more pressure differential values and sets the presumed operating characteristic as the operating characteristic of the holding valve 531. It is noted that the operating characteristic obtaining control can be executed before the vehicle is shipped or at the vehicle inspection timing. Further, it is noted that at the step S106, the brake ECU 6 may be set to judge whether or not the change of pressure value of the pressure sensor 73 becomes equal to or more than a predetermined range. In other words, the threshold value for detecting the opening of the holding valve 531 can be set to the pressure change amount (range) of the second fluid pressure chamber 1C.

(Advantageous Effects from First Embodiment)

According to the vehicular brake device according to the first embodiment, the operating characteristic can be obtained based on the pressure of the second fluid pressure chamber 1C without using the directly measured values of the pressures at the upstream side and the downstream side of the holding valve 531, which receives less influence from the pressure deviation of the directly measured values of the pressures. In other words, according to this embodiment, the influence by the pressure deviations at the upstream side and the downstream side of the holding valve 531, particularly, the influence by the pressure deviation at the downstream side (wheel cylinders 541 through 544 side) of the holding valve 531 can be excluded to accurately obtain the operating characteristic.

At the step S103, by the increase of the servo pressure, the master pistons 14 and 15 advance and then the brake fluid in the master chambers 1D and 1E flows out to the wheel cylinders 541 through 544 side of the holding valve 531. Under this state, if the pressure decreasing valve 532 is in a closed state, the brake fluid flown out of the master chambers 1D and 1E flows into the wheel cylinders 541 through 544 via the holding valve 531 and the conduit 53a. A regular or ordinal wheel cylinder has the characteristic as shown in FIG. 4 that the flow-in amount change ratio is smaller at the high pressure side area than at the low pressure side area. Accordingly, if the master piston 14 is advanced up to the stroke position corresponding to the stroke amount S1 or more than that at the step S103 without controlling the pressure decreasing valve 532 as normal, the brake fluid starts flowing into the wheel cylinders 541 through 544 to easily raise the wheel pressure equal to or more than the value "p3".

According to this embodiment, as the pressure decreasing valve 532 is made to be in a closed state at the step S102, the brake fluid flowing out of the master chambers 1D and 1E during the advancement control at the step S103 flows not only into the wheel cylinders 541 through 544, but also flows into the reservoir 533 through the second fluid passage 53b. This can suppress the pressure from increasing more than the value equal to or more than the wheel pressure value p3 upon the advancement control. In other words, upon obtaining the operating characteristic, the low pressure side area of the operating characteristic of the wheel cylinders 541 through 544 can be used, in which the flow-in amount change ratio is great. This means that upon obtaining the operating characteristic, the area where the inclination of the P-Q operating characteristic is steep can be utilized.

At the low pressure side area, the change amount of the brake fluid flow-in amount relative to the change of the wheel pressure is large compared to the high pressure side area. Accordingly, when the holding valve 531 is opened as the electromagnetic driving force becomes smaller than the pressure differential operating force due to the predetermined pressure differential, the brake fluid flow-in amount into the wheel cylinders 541 through 544 becomes large relative to the same pressure change. In other words, compared to the case of the high pressure side area, the pressure differential change becomes small upon the opening of the holding valve 531 and the valve opening state can be easily continued and compared to the case where the pressure decreasing valve 532 is not opened, the first master piston 14 advances further forward and the pressure change amount in the second fluid pressure chamber 10 becomes large. Accordingly, the detection of the fluid pressure change in the second fluid pressure chamber 10 accompanied by the opening of the holding valve 531 can be accurately and securely performed according to this embodiment. In other words, according to this embodiment, the detection of the valve opening electric current of the holding valve 531 can be performed with accuracy and operating characteristic of the holding valve 531 can be obtained with accuracy.

Further, according to the embodiment, since the brake fluid flow-in into the wheel cylinders 541 through 544 accompanied by the advancement control can be prevented by utilizing the pressure decreasing valve 532 and the reservoir 533 of an already existing ABS 53, no additional components are necessary to be added and the number of components is reduced and increase of the manufacturing cost can be avoided.

Further, according to the embodiment, at the step S108, the pump 534 pumps up the predetermined amount of brake fluid. The predetermined amount of the brake fluid corresponds to the fluid amount flowing into the reservoir 533 during the advancement control and this amount is calculated in advance according to the embodiment. The brake ECU 6 executes a control so that a necessary amount of electricity can be supplied to the motor 535 which operates the pump 534 to pump up the predetermined amount of the brake fluid. In other words, according to the embodiment, the pump 534 is driven by the minimum electricity necessary for changing the reservoir 533 to the original state (the state before the advancement control is executed) by pumping up the brake fluid in the reservoir 533. Thus, upon obtaining the operating characteristic, the increase of the electricity consumption can be suppressed. Still further, according to the embodiment, since a normally closed type valve, which is closed when no electricity is supplied, is used for the pressure decreasing valve 532 the energization thereof is made during the advancement control to suppress the increase of the consumption of the electricity.

Further, the area "As" of the rear end surface of the first master piston 14 facing to the servo chamber 1A is set to be large compared to the area "Am" of the front end surface of the first master piston 14 facing to the first master chamber 1D (As>Am). In other words, the value of ratio "As/Am" is larger than one (1). Accordingly, the displacement amount (stroke) of the first master piston 14 relative to the change amount of the pressure differential between the servo pressure and the master pressure (servo pressure>master pressure) becomes large. Accordingly, the first master piston 14 largely advances and the change of pressure in the second fluid pressure chamber 1C becomes large when the master pressure is decreased due to the opening of the holding valve 531. Thus, the detection of pressure increase in the second fluid pressure chamber 1C due to the opening of the holding valve 532 can be accurately made. The master cylinder 1 is formed so that the displacement of the first master piston 14 relative to the fluid pressure change in the first master chamber 1D becomes large. The master cylinder 1 is formed so that the fluid pressure change in the second fluid pressure chamber 10 becomes larger than the fluid pressure change in the first master chamber 1D.

Further, since the second fluid pressure chamber 10 is connected to the stroke simulator 21, the operating characteristic can be appropriately obtained by utilizing the characteristic of the stroke simulator. The second fluid pressure chamber 10, together with the first fluid pressure chamber 1B, functions as a hydraulic pressure chamber which generates the reaction force against the brake pedal 10 depression force. In other words, according to the embodiment of the present invention the second fluid pressure chamber 10 formed frontward of the first master piston 14 is utilized as a means for obtaining the operating characteristic in the vehicular brake device having two separately located hydraulic pressure chambers. According to this structure, since there needs no additional device for obtaining the operating characteristic, it is advantageous in manufacturing cost.

It is noted that the brake ECU 6 according to the embodiment functions as a means for causing the servo pressure generating device 4 to execute an advancement control execution in which the first master piston 14 is moved up to the stroke position inside the advancement side area, a means for controlling the pressure decreasing valve 532 for a period which includes at least a portion of time in the advancement control execution period (in this embodiment the entire execution period of the advancement control), a means for decreasing or increasing the electric power supply to the holding valve 531 under the state that the predetermined pressure differential is being generated, a means for detecting whether or not the pressure in the second fluid pressure chamber 10 becomes equal to or more than a predetermined pressure, accompanied by the decrease or the increase of the electric power supply (or whether or not the change of the pressure in the second fluid pressure chamber 10 becomes equal to or more than a predetermined range), a means for detecting the electric power supplied to the holding valve 531 by means of the pressure sensor 73 when the pressure in the second fluid pressure chamber 10 becomes equal to or more than the predetermined pressure (or the change of pressure becomes equal to or more than the predetermined range), a means for setting the operating characteristic of the holding valve 531 based on the detected supplied electric power and a means for controlling the pump 544 and the motor 545 to flow a predetermined amount of brake fluid towards the master chambers 1D and 1E side relative to the holding valve 531.

Second Embodiment

The vehicular brake device according to the second embodiment differs from the vehicular brake device of the first embodiment in the controlling of the pressure decreasing valve 532. Accordingly, the explanation of the structures of the same portions and the functions to those of the first embodiment will be omitted, explaining merely the difference by referencing the drawings of the first embodiment.

Figure 8:
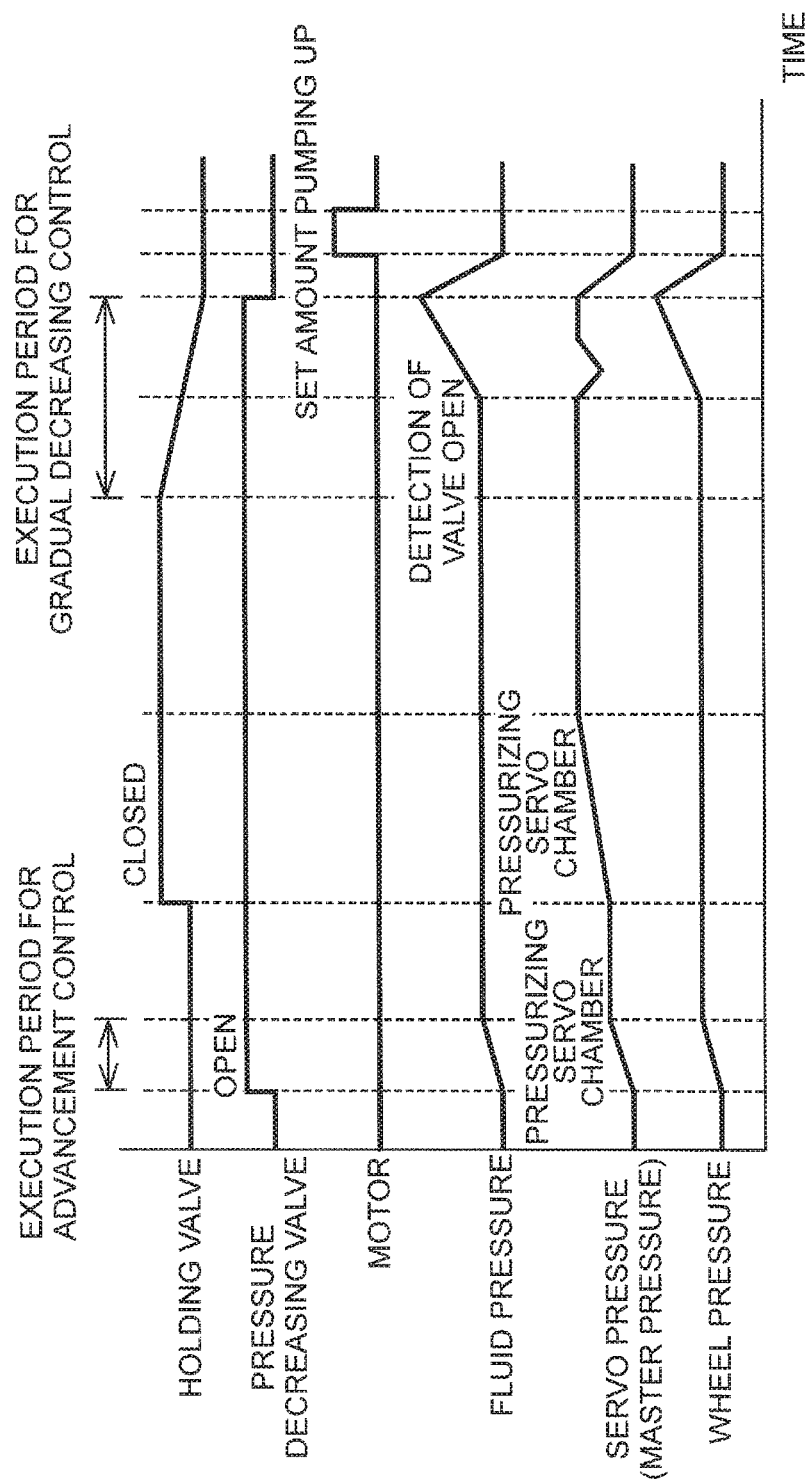
FIG. 8 is a timing chart regarding to the operating characteristic obtaining control according to a second embodiment of the invention.
Figure 9:
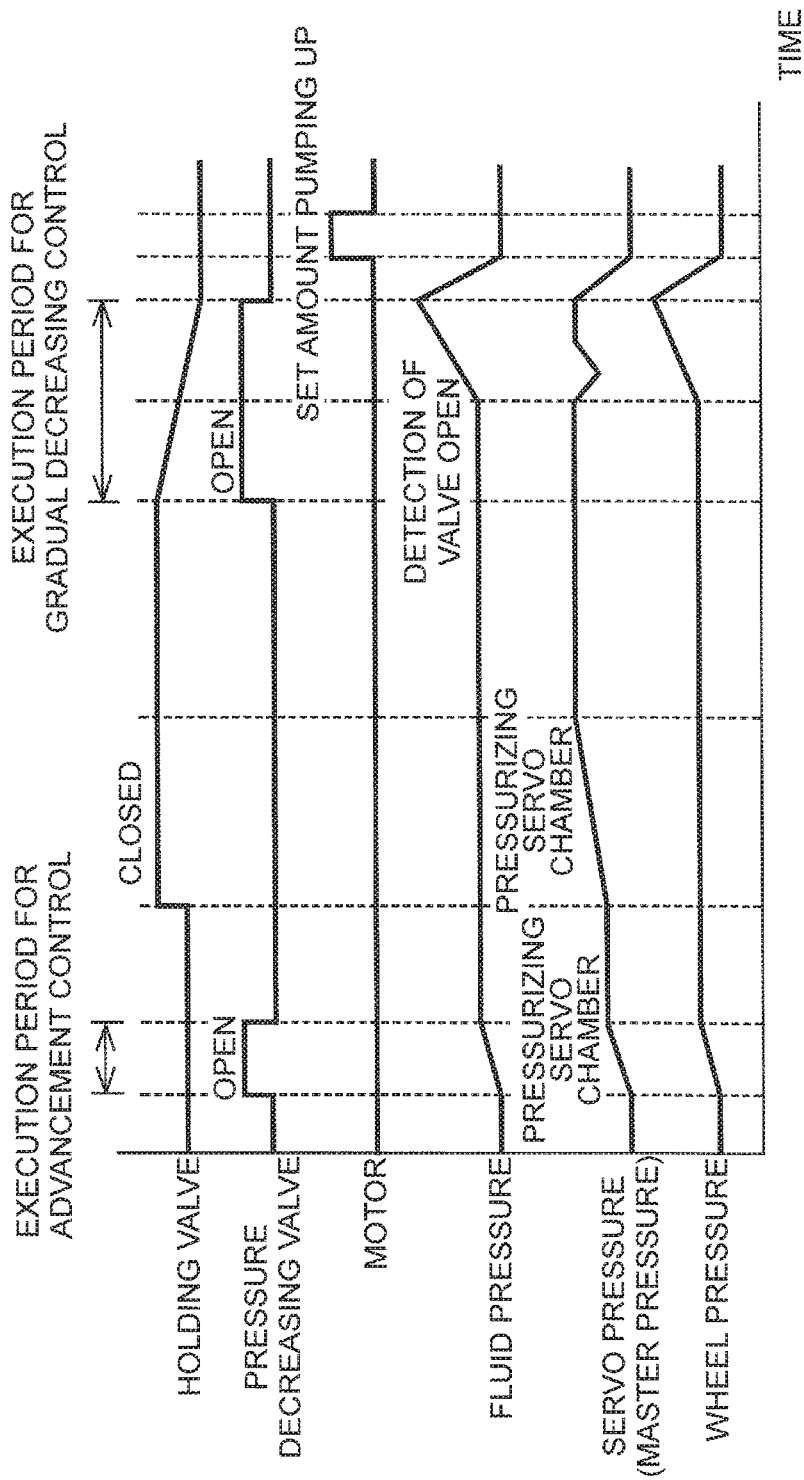
FIG. 9 is a timing chart regarding to the operating characteristic obtaining control according to a modified embodiment of the second embodiment of the invention.

As shown in FIG. 8, the pressure decreasing valve 532 according to the second embodiment is controlled by the brake ECU 6 to be open at the time of start of advancement control to keep the opening state even the execution of the advancement control ends and to close after the gradual decrease control of supplying the electric power to the holding valve 531. In other words, the pressure decreasing valve 532 is kept in the open state during the execution of the advancement control and during the execution of gradual decrease control.

By controlling the pressure decreasing valve 532 to be in the open state during the execution of gradual decrease control, when the holding valve 531 is opened as the electromagnetic driving force becomes smaller than the pressure differential operating force generated by the pressure differential, the brake fluid flowing out of the master chambers 1D and 1E flows into the reservoir 533 via the pressure decreasing valve 532 if the reservoir 533 has not been filled-up. By introducing the brake fluid into the reservoir 533, into which the brake fluid is easier to be introduced than the introduction of the brake fluid into the wheel cylinders 541 through 544, the advancement amount of the first master piston 14 upon the opening of the holding valve 531 can be increased. Thus, the change amount of the fluid pressure in the second fluid chamber 10 upon the opening of the holding valve 531 can be further increased thereby to accurately detect the opening timing of the holding valve 531 and as a result, the detection of the valve opening electric current can be accurately made.

Further, in this second embodiment, at the step S108 in FIG. 5, the predetermined amount that the pump 534 pumps up can be set to the maximum volume of the capacity of the reservoir 533. In other words, the brake ECU 6 instructs the electric power supplying means (not shown) to have the same supply the motor 535 with electricity for pumping up the maximum volume of the capacity. Therefore, an excess pumping up operation can be prevented to suppress the increase of electricity consumption thereby.

Modified Embodiment

The present invention is not limited to the embodiments explained above and for example, it may be possible to provide an ESC (Electronic Stability Control) device, instead of, or together with, the ABS 53. In this case, the input valve of the ESC (corresponding to an electromagnetic valve located at a position of the holding valve 531) can be the object of obtaining the operating characteristic. In the case of using the ESC, an electromagnetic valve corresponding to the pressure decreasing valve 532 and a reservoir corresponding to the reservoir 533 are provided and the effects according to the first embodiment can be achieved. The object of obtaining the operating characteristic may be an electromagnetic valve of a pressure adjusting device provided between the master chambers 1D and 1E and the wheel cylinders 541 through 544. The pressure adjusting device is used for adjusting the fluid pressure in the wheel cylinders 541 through 544.

Further, the invention is applicable to the device that does not include such pressure adjusting device. In such a case, for example, the electromagnetic valve (first electromagnetic valve) disposed between the master chambers 1D and 1E and the wheel cylinders 541 through 544 is the object of obtaining the operating characteristic and in such case, a second electromagnetic valve is provided in a fluid passage which connects the first electromagnetic valve and the reservoir (reservoir portion) at the wheel cylinders 541 through 544 side relative to the first electromagnetic valve. According to this modified embodiment, the operating characteristic of the first electromagnetic valve can be accurately obtained by executing the control similar to the control in the first or the second embodiment.

Still further, the comparison between the pressure measured by the pressure sensor 73 (hereinafter referred to as "sensor pressure value") and the threshold value may be made as follows. It is noted that the sensor pressure value exhibits approximately a constant value under the predetermined pressure differential is generated between both sides of the electromagnetic valve 531. The threshold value is set to a value somewhat higher than a constant stable value because it is detected just after the sensor pressure value starts to increase from the substantially constant and stable value.

It is noted here that the sensor pressure values frequently include noises, such as converting noises, and therefore, the standard deviation of the sensor pressure value for a predetermined time is calculated per unit of time at the time when the sensor pressure value becomes stable after the pressure differential is generated. At the same time the average value of the sensor pressure value at the predetermined time is calculated per the unit of time. The brake ECU 6 calculates the standard deviation and the average value per unit of time (calculation of so-called "moving average") and compares the upper limit value of the standard deviation at the "n"th time (wherein the "n" is a natural number) with the average value at the "n+1"th time. When the average value at the "n+1"th time ($Av_{n+1}$) is larger than the upper limit value of the standard deviation at the "n"th time ($St_{nmax}$) ($Av_{n+1} > St_{nmax}$), the brake ECU 6 judges that the sensor pressure value has exceeded the threshold value and detects and memorizes the supply electric power to the electromagnetic valve 531 at the start of the predetermined time of the "n+1"th time. Thus the influence of measuring value variation due to noises can be suppressed. Accordingly, the valve opening time can be detected based on the actually measured value (actual value) of the pressure sensor 73 and the detection of the minimum supply electric power can be accurately made.

This invention can be applicable to the setting of the operating characteristic of the normally closed type electromagnetic valve. In this case, when the fluid pressure in the second fluid chamber 10 becomes equal to or more than the predetermined value by gradually increasing the supply electric power to the normally closed type electromagnetic valve (gradual increase control), the supply of electric power to the normally closed type electromagnetic valve is detected and based on the detected supplied electric power, the operating characteristic of the normally closed type electromagnetic valve can be set.

According to the embodiments described above, the "hydraulic pressure chamber" is defined to be the second fluid pressure chamber 10, however, a pressure chamber may be provided independently of the second fluid pressure chamber 10 in the master cylinder 1, wherein the independently provided chamber generates the fluid pressure in the second fluid chamber 10 according to the stroke position of the master piston.

According to the embodiments above, the fluid pressure of the brake fluid is generated as the "fluid pressure" in the second fluid pressure chamber 10. However, another fluid pressure chamber may be provided in the master cylinder 1 which generates the gaseous pressure in response to the stroke position of the master piston.

The invention claimed is:
1. A vehicular brake device comprising:
a master cylinder which includes a master chamber connected to a wheel cylinder, a drive pressure chamber which generates a drive pressure for driving a master piston and a hydraulic pressure chamber which generates a hydraulic pressure in response to a stroke position of the master piston;
a first electromagnetic valve provided between the master chamber and the wheel cylinder for controlling a flow of brake fluid between the master chamber and the wheel cylinder in response to a supplied electric power;
a first flow passage for connecting the first electromagnetic valve and the wheel cylinder; a second flow passage for connecting a reservoir portion which can reserve the brake fluid therein and the first flow passage;
a second electromagnetic valve provided in the second flow passage;
a second electromagnetic valve control means for controlling the second electromagnetic valve; a drive pressure generating means for generating the drive pressure in the drive pressure chamber;

a pressure differential generating means for generating a predetermined pressure differential between a master cylinder side and a wheel cylinder side relative to the first electromagnetic valve;

a supplied electric power control means for controlling the supplied electric power to the first electromagnetic valve to be decreased or increased under a state that the predetermined pressure differential is generated;

a hydraulic pressure detecting means for detecting whether or not the hydraulic pressure becomes equal to or more than a predetermined pressure or whether or not a change range of the hydraulic pressure becomes equal to or more than a predetermined range in response to a decrease or an increase of the supplied electric power;

a supplied electric power detecting means for detecting the supplied electric power to the first electromagnetic valve when the hydraulic pressure detecting means detects that the hydraulic pressure becomes equal to or more than the predetermined pressure or the hydraulic pressure detecting means detects that the change range of the hydraulic pressure is equal to or more than the predetermined range; and, an operating characteristic setting means for setting an operating characteristic which is a relationship between the supplied electric power to the first electromagnetic valve in the first electromagnetic valve and a pressure differential between the master cylinder side and the wheel cylinder side relative to the first electromagnetic valve, based on the supplied electric power detected by the supplied electric power detecting means, wherein the wheel cylinder has a characteristic that when a ratio of in-flow amount of the brake fluid flowing into the wheel cylinder relative to an increase amount of a wheel pressure is assumed to be a fluid amount change ratio, the fluid amount change ratio in a low pressure side area in which the wheel pressure is defined to be from an initial pressure to a first pressure which is higher than the initial pressure, is higher than the fluid amount change ratio in a high pressure side area in which the wheel pressure is defined to be from a second pressure which is higher than the first pressure to a third pressure which is higher than the second pressure;

the hydraulic pressure chamber has a characteristic that when a ratio of increase amount of the hydraulic pressure relative to an advancement amount of the master piston is assumed to be a pressure change ratio, the pressure change ratio in an initial side area in which a position of the master piston is defined to be from an initial position to a first stroke position which is more advanced side than the initial position, is smaller than the pressure change ratio in an advanced side area in which the position of the master piston is defined to be from a second stroke position which is more advanced side than the first stroke position to a third stroke position which is more advanced side than the second stroke position;

the pressure differential generating means generates the predetermined pressure differential by moving the master piston by the drive pressure generating means, after an execution of an advancement control to advance the master piston so that the master piston is positioned at a stroke position within the advanced side area, and wherein the second electromagnetic valve control means controls the second electromagnetic valve to be in an open state for a period including at least a portion of time of an execution period of the advancement control.

2. The vehicular brake device according to claim 1, further comprising:

a flowing out portion which flows the brake fluid out of the reservoir portion towards the master chamber side relative to the first electromagnetic valve; and a flowing out portion control means for controlling the flowing out portion to flow a predetermined amount of the brake fluid out of the reservoir portion towards the master chamber side relative to the first electromagnetic valve, when the hydraulic pressure detecting means detects that the hydraulic pressure becomes equal to or more than the predetermined pressure or that the change range of the hydraulic pressure becomes equal to or more than the predetermined range in response to the decrease or the increase of the supplied electric power, wherein the predetermined amount of the brake fluid corresponds to a fluid amount of the brake fluid flowing into the reservoir portion by the advancement control; and the second electromagnetic valve control means controls the second electromagnetic valve to be the open state in the execution period of the advancement control.

3. The vehicular brake device according to claim 1, wherein, the second electromagnetic control valve is a normally closed valve which is closed under non-energized state.

4. The vehicular brake device according to claim 1, wherein, the second electromagnetic valve control means controls the second electromagnetic valve to be in an open state during an execution of a decrease or an increase control of the supplied electric power to the first electromagnetic valve.

5. The vehicular brake device according to claim 1, further comprising:

a pressure adjusting means disposed between the master chamber and the wheel cylinder for adjusting the wheel pressure, wherein the pressure adjusting means includes the first electromagnetic valve, the second electromagnetic valve, the reservoir portion and the flowing out portion which flows the brake fluid out of the reservoir portion towards the master chamber side relative to the first electromagnetic valve.

* * * * *